United States Patent
Weller (10) Patent No.: US 9,128,908 B2
(45) Date of Patent: Sep. 8, 2015

(54) CONVERTING REPORTS BETWEEN DISPARATE REPORT FORMATS

(75) Inventor: Tobias Weller, Edingen-Neckarhausen (DE)

(73) Assignee: SAP SE, Walldorf (DE)

(*) Notice: Subject to any disclaimer, the term of this patent is extended or adjusted under 35 U.S.C. 154(b) by 932 days.

(21) Appl. No.: 13/329,353

(22) Filed: Dec. 19, 2011

(65) Prior Publication Data

US 2013/0159831 A1  Jun. 20, 2013

(51) Int. Cl.
G06F 17/00 (2006.01)
G06F 17/21 (2006.01)
G06F 17/30 (2006.01)

(52) U.S. Cl.
CPC ........ *G06F 17/211* (2013.01); *G06F 17/30914* (2013.01)

(58) Field of Classification Search
CPC .............. G06F 17/30569; G06F 17/30905; G06F 17/30914
USPC .......... 715/200, 221, 226, 234, 239
See application file for complete search history.

(56) References Cited

U.S. PATENT DOCUMENTS

| | | | |
|---|---|---|---|
| 6,581,054 B1* | 6/2003 | Bogrett | 1/1 |
| 2004/0088650 A1* | 5/2004 | Killen et al. | 715/503 |
| 2004/0133876 A1* | 7/2004 | Sproule | 717/105 |
| 2004/0194024 A1* | 9/2004 | Marzan | 715/513 |
| 2004/0194031 A1* | 9/2004 | Hays et al. | 715/530 |
| 2005/0033726 A1* | 2/2005 | Wu et al. | 707/1 |
| 2005/0262087 A1* | 11/2005 | Wu et al. | 707/9 |
| 2006/0136315 A1* | 6/2006 | Muthiki et al. | 705/35 |
| 2008/0256429 A1* | 10/2008 | Penner et al. | 715/200 |
| 2008/0313153 A1 | 12/2008 | Lawrence et al. | |
| 2011/0173529 A1* | 7/2011 | Wagner | 715/235 |

OTHER PUBLICATIONS

SAP AA; SAP Crystal Reports; Professional-Grade Reporting for All Employees (What's New in SAP Crystal Reports 2008); published on-line 2010 by SAP AA; 4 pages (http://download.sap.com/solutions/sap-crystal-solutions/.../download.epd?context).

* cited by examiner

*Primary Examiner* — Stephen Hong
*Assistant Examiner* — Gregory J Vaughn (57) ABSTRACT

Various embodiments of systems and methods for converting reports between disparate report formats are described herein. In one aspect, a first report in a markup data schema is received. On another aspect, a second report in a banded report schema, comprising one or more bands, is created. The second report is created as a blank report. First report formatting settings of the first report are converted to second report formatting setting of the second report. Report content and report content layout from the first report are converted to the second report.

18 Claims, 7 Drawing Sheets

CONVERTING REPORTS BETWEEN DISPARATE REPORT FORMATS

FIELD

The field generally relates to reporting and transformation of reports.

BACKGROUND

With greater access to Information Technology (IT), enterprises have increased capacity and desire to produce and use reports to view useful data. Reports are used in a lot of different fields, such as business, marketing, human resources, education, and others. Reports contain information retrieved from (i.e., in response to computer executable instructions) a data source (e.g., a database, a data warehouse, and the like), where the information is typically structured in accordance with a report schema that specifies the form in which the information may be presented. Reports are usually built by inserting report data items and other formulas into a containment hierarchy of report elements, each structured in graphical zones that are arranged with respect to axes. Any value displayed in a report, or report value, belongs to a specific instance of a zone in a terminal reporting element, and is thus obtained by computing a formula in a dimensional context determined by one of the many combinations of values for each of the axes that govern this zone. Filters may also be assigned to the reporting elements.

There are various software systems and tools that provide techniques for analysis and presentation of information, as well as storing and managing of reports and analytics. Business Intelligence (BI) is a term used to describe a category of systems and applications used to gather, store, provide access to, and analyze data to help enterprise users make better business decisions. Applications that exemplify BI include querying and reporting, online analytical processing (OLAP), profiling, statistical analysis, and forecasting. Examples of applications that allow creation of human-readable reports are BI solutions, such as SAP® Crystal Reports®. There are however a lot of other publically available products that may offer different functionality for preparing the design, visualization, and delivery of reports in various formats. Enterprises may use many different reporting tools with various schemas. However, migrating data from one reporting tool to another imposes a significant burden on IT resources.

SUMMARY

Various embodiments of systems and methods for converting reports between disparate report formats are described herein. In one embodiment, the method includes receiving a source report related to a markup data schema and creating a target report related to a banded report schema. Report formatting settings, report content and report content layout from the source report are converted to the target report. The report content comprises information presented in the source report and the report content layout defines the position and the manner in which the report content is displayed.

In other embodiments, the system includes at least one processor for executing program code and memory, comprising a receiving module to receive a source report related to a markup data schema and a target report generating module that is in communication with the receiving module to create a target report related to a banded report schema. The system also includes a formatting conversion module to convert report formatting settings of the source report to the target report and a content conversion module to convert report content and report content layout from the source report to the target report.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for converting reports between disparate report formats are described herein. In the following description, numerous specific details are set forth to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment.

Furthermore, the particular features, structures, or characteristics may be combined in any suitable manner in one or more embodiments.

A common use case when working with reports is transferring from one reporting tool to another. That creates a need to transition from the report format that is used for storing the reports in the previously adopted reporting tool to the newly chosen one. The reports can be associated with different data schemas stored in different file formats that have specific report formatting. For example, a transition can be made from an eXtensible Markup Language (XML) based report to a report in a banded report format, such as an .RPT format used by SAP® Crystal Reports® by SAP AG.

Figure 1:
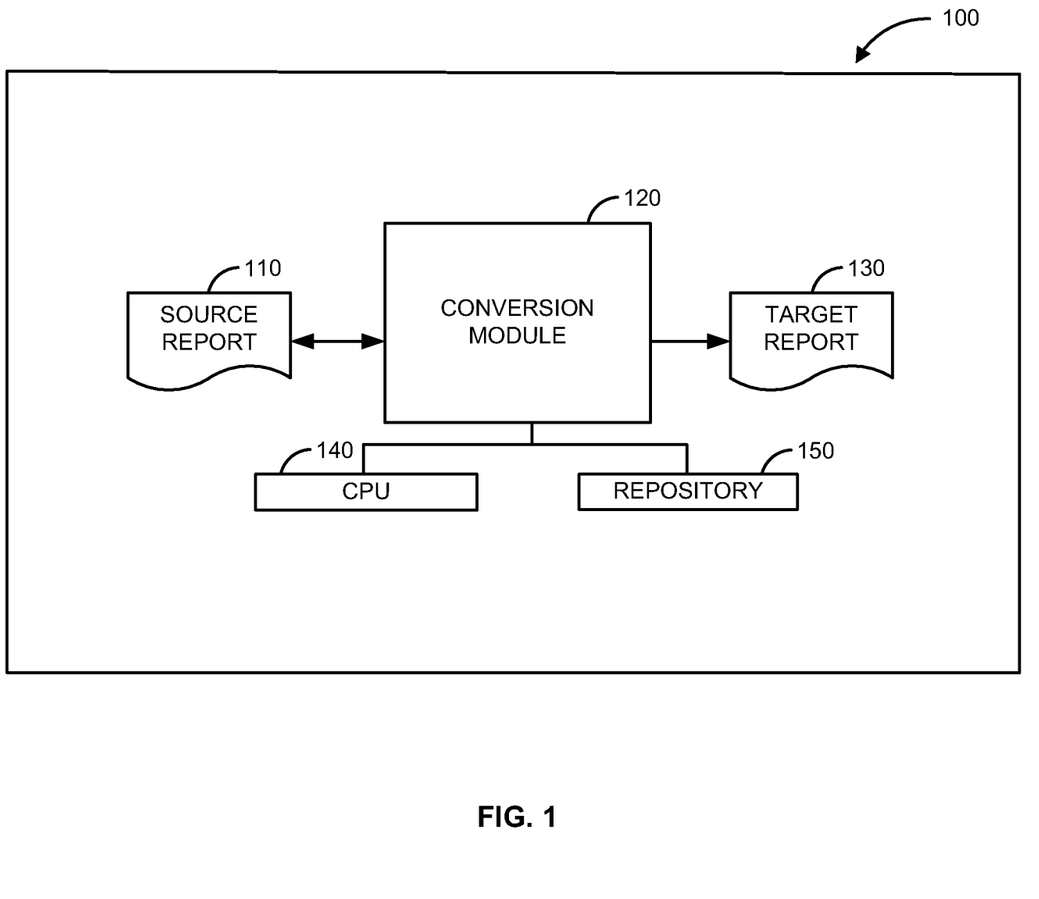
FIG. 1 is a block diagram illustrating an embodiment of a system for conversion of a source report related to a markup data schema into a target report related to a banded report schema.

FIG. 1 is a block diagram illustrating an embodiment of a system 100 for conversion of a source report 110 related to a markup data schema into a target report 130 related to a banded report schema. The system 100 includes the source report 110, the target report 130, and a conversion module 120. The conversion module 120 enables the conversion of the source report 110 related to the markup data schema to the target report 130 related to the banded report schema. The markup data schema is a model for the representation of the information structure in the source report. It defines the structure of the report content, the report content layout and the report formatting settings. The function of the conversion module 120 is to receive and read the source report 110 and create the target report 130 that corresponds to the source report 110. In one embodiment, the source report 110 contains source report formatting settings, report content and report content layout. The data schema of the source report 110 may be defined with a markup language, for example, XML.

In one embodiment, the banded report schema for the target report 130 presents grouped data and detailed data, and includes one or more bands. The bands are data containers that may organize target report objects. The bands are horizontal sections that are part of a report structure of the target report and are displayed in the report as many times as defined for the part of the report structure. They may include a report header, a page header, a page footer, a report footer, and a details band. The details band is a band that can contain subbands, which are also bands. For example, reporting tools such as SAP® Crystal Reports® by SAP AG, Microsoft® SQL Server® Reporting Services by Microsoft Corporation, Pentaho® Business Analytics by Pentaho Corporation employ banded reports.

In one embodiment, the target report 130 may be in an .RPT format. The file extension .RPT is often used for report files. Several software tools use the .RPT format. For example, SAP® Crystal Reports® uses the .RPT file format. This is a software program that empowers business users to explore, view, report, visualize, and manage information in an intuitive way. A file in an .RPT format is a binary file and usually contains American Standard Code for Information Interchange (ASCII) plain text code in it. Such a file may be viewed printed or converted into another format. It defines the report schema by defining where and how data will be extracted from a data source and how it will be displayed. For example, it may be filtered, grouped, and sorted.

In one embodiment, the conversion module 120 is associated with hardware, software, and data resources. In one embodiment, the conversion module 120 is associated with a CPU 140 and a repository 150 to assist the process of conversion which makes changes in the form and properties of the target report 130. The system 100 includes the CPU 140 for execute the program code. The repository 150 stores part of the data from the source report that may be accessed and used in the target report. In one embodiment, the repository 150 may contain, for example, images, charts, etc.

Figure 2:
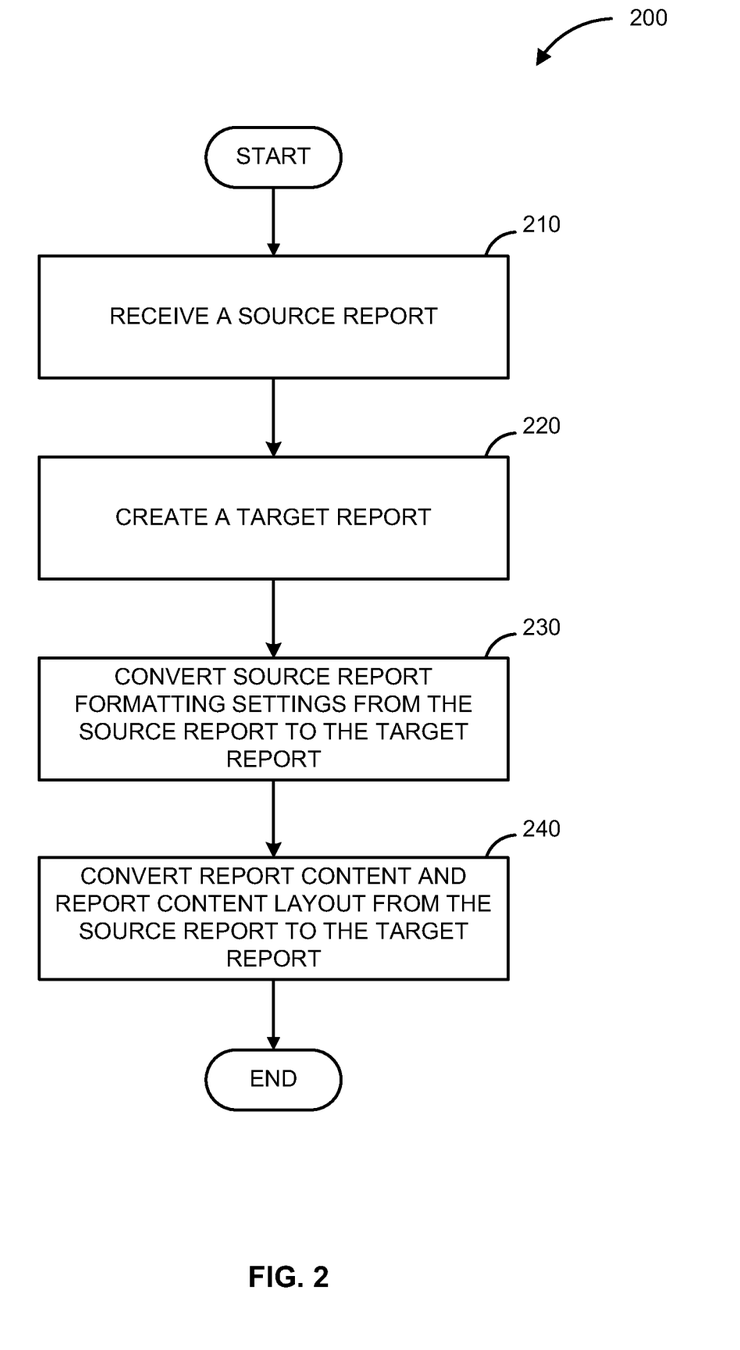
FIG. 2 is a flow diagram illustrating an embodiment of a method for conversion of a source report related to a markup data schema into a target report related to a banded report schema.

FIG. 2 is a flow diagram illustrating an embodiment of a method 200 for conversion of a source report related to a markup data schema into a target report related to a banded report schema. The method begins at process step 210, where the source report in the markup data schema, such as the source report 110, is received. Further, at the next process step 220, a target report in the banded report schema is created. The newly created target report is blank. The target report is with one or more bands, such as the target report 130. At step 230, source report formatting settings of the source report are converted to target report formatting settings of the target report. The source report formatting settings include a source page setup and a source report structure. The report structure consists of a number of source report sections. The source report sections have a grid layout with rows of cells. The step 230 includes converting the source page setup and the source report structure to the newly-created target report. The source page setup is defined by the page orientation, page height and page width of the report page. The page orientation may define whether the page is displayed horizontally in portrait orientation or vertically in landscape orientation.

At step 240, report content and report content layout from the source report are converted to the target report. There are row patterns defined for rows that give reference to the report content and define the report content layout. The report content presents the information in the source report and includes source report fields and source report objects. The report content layout includes report content positioning and display properties of the source report. The display properties include styles that may be styles for the cells or styles for the text. Moreover, the display properties include row pattern rules. These rules are formatting rules that allow choosing from alternative row patterns to be used in the source report sections.

According to one embodiment, the row pattern rules contain a rule which is a Boolean expression. It may be determined to be either "true" or "false", to define whether a row pattern would be applied to the source report section or not. Furthermore, the row pattern rules include an optional row pattern which will be applied in case the Boolean expression is determined to be "false", which means that it will not be valid. When there is a rule with a Boolean expression that is determined to be "true", the row pattern rule is valid. Hence, the target report 130 would have a report structure that corresponds to the source report structure and will be filled with the report content of the source report, represented in such a way that it corresponds to the report content layout of the source report. In one embodiment, the target report 130 may be displayed in a reporting tool.

In one embodiment, when making the conversion of the report content and the report content layout from the source report to the target report, a connection to a repository (e.g., 150 in FIG. 1) is made. The repository stores the report content of the source report and it stores information about the display properties. The target report content positioning is determined for the target report objects from the target report. The target report objects from the target report that corresponds to the cells presenting the report content from the repository are inserted. For these target report objects, the determined target report content positioning is applied. The styles that are used in the source report are converted into corresponding styles for the target report. From these corresponding styles, a matching style is applied for the target report objects when there is a style defined for the report content of the source report. When there is a row pattern rule defined for the row patterns in the source report, the rule from the row pattern rule is converted into a conditional formula for formatting settings. If the row pattern rule defined in the source report is valid, the conditional formula for the formatting settings would be applied in the target report.

In one embodiment, during determining the target report content positioning for the target report objects, the report content positioning of the cells is read from the repository. Coordinates for the positioning of the cells is determined. The size of the cells is interpreted by the cell height and cell width. The number of source report fields within the cells is determined. A content type of the source report fields of the source report is identified. The content type may be data or text. When the content type is text, the information is stored in a text field. Text may be interpreted as an input from an end user who is preparing the report. On the basis of the values for the cell width, cell height and the number of the source report objects in a cell, the size of the target report objects is calculated. On the basis of the coordinates of the cells from the source report and the consequent number of the position of the source report fields in the cell, and the width of the target report object, the coordinates for the target report objects are calculated. The consequent number of the position of the source report field may take values from 1 to the number of source report fields in a cell.

Figure 3A:
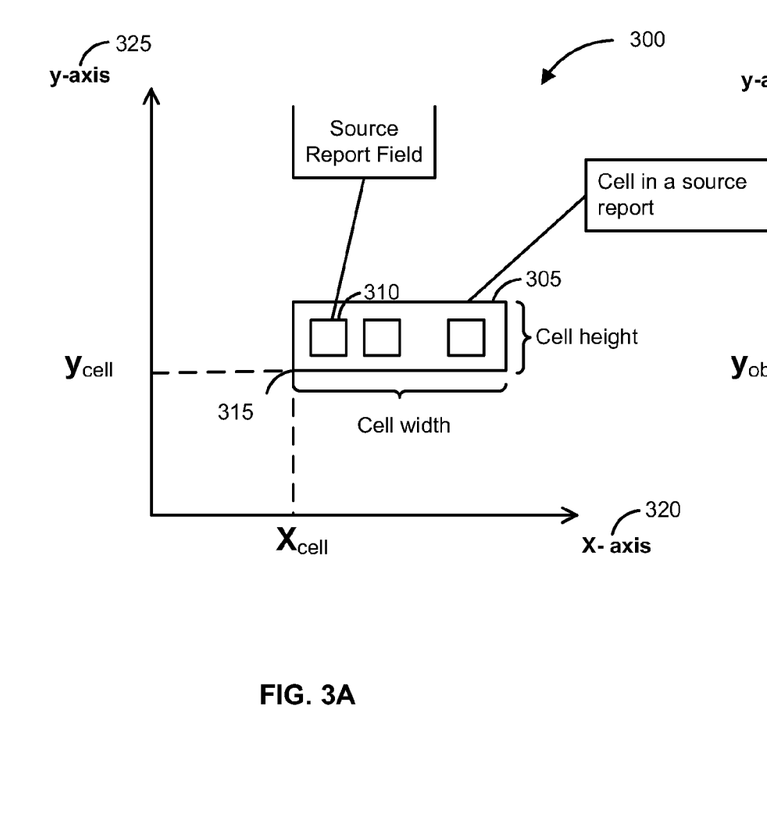
FIG. 3A is a block diagram illustrating a position and size of a cell with one or more source report fields from a source report in a coordinate system, according to one embodiment.

FIG. 3A is a block diagram illustrating a position and size of a cell with one or more source report fields from a source report (e.g., 110 in FIG. 1) in a coordinate system 300, according to one embodiment. Cell 305 is a cell from the source report presented in the coordinate system 300. In one embodiment of the invention, the determination of the positioning may be done by reading the size and position of the cells that are in the grid layout of the source report from the source report. The cells store the source report fields from the source report, such as a source report field 310. In one cell there may be a couple of source report fields. In one embodiment, number of the source report fields in a cell may be read from the source report. The size of the cells is determined by the cell height and cell width. In one embodiment, the position of the cells is defined by the edge point 315 of the cell that is closer to the x-axis 320 and y-axis 325 in a coordinate system. The x-coordinate of the edge point 315 is $X_{cell}$ and the y-coordinate of the edge point 315 is $Y_{cell}$.

Figure 3B:
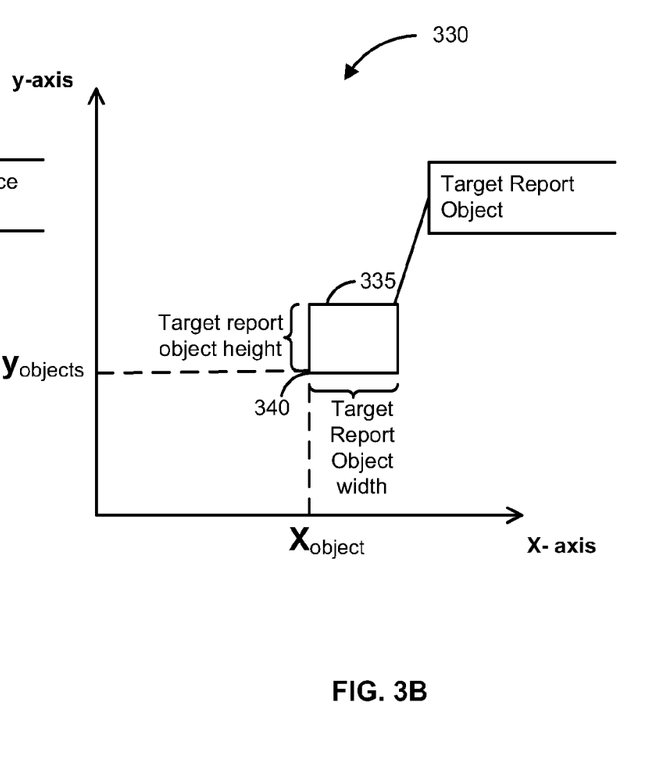
FIG. 3B is a block diagram illustrating a position and size of a target report object from a target report in a coordinate system, according to one embodiment.

FIG. 3B is a block diagram illustrating a position and size of a target report object from a target report (e.g., 130 in FIG. 1) in a coordinate system 330, according to one embodiment. Block 335 is an example of a target report object that corresponds to a source report field 310 from FIG. 3A. The size of a target report object in the target report is calculated on the basis of the information about the cell size of the corresponding cell from a source report (e.g., 110 in FIG. 1) and the number of source report fields in the cell. The target report object width is proportional to the cell width and inversely proportional to the number of source report fields in the cell. The target report object height is proportional to the height of the cell from a source report. In an embodiment the width and height are:

$$\text{target report object width} = \frac{\text{cell width}}{\text{number of source report fields in a cell}} \quad (1)$$

$$\text{target report object height} = \text{cell height} \quad (2)$$

The position of the target report objects in the target report is calculated on the basis of the coordinates of the cell from the source report, the target report object width, and the position of the source object field from the cell in the source report. The position of the target report objects is determined by the coordinates for an edge point 340, which are $X_{object}$ and $Y_{object}$. The $X_{object}$ is proportional to the sum of the $X_{cell}$ (from FIG. 3A) and a term proportional to the product of the position of the source report object minus an offset (e.g. 1 unit) and the target report object width. The $Y_{object}$ is equal to $Y_{cell}$ (from FIG. 3A). In one embodiment the positions are:

$$X_{object} = X_{cell} + (\text{position of the source report field} - 1) \times \text{target report object width} \quad (3)$$

$$Y_{object} = Y_{cell} \quad (4)$$

The number of target report objects that may correspond to a source report field (e.g., 310 in FIG. 3A) depends on a content type of the source report field. The source report fields may be data fields or text fields. When there are data fields in the source report, they are positioned in two separate target report objects—one for a value and one for a unit of measure. For example, in the source report fields, which are data fields, a typical data may refer to an amount of money, e.g. $1000. This data field contains the amount of money—1000, and the currency that is used—$. In one embodiment, these two parts may be stored in two different target report objects in the target report, such as the target report object 335. In one embodiment, the size of these fields may be defined as a portion of the size of the source report field from the source report. For example, the target report object that would be used for the currency may be approximately one quarter of the size of the source report field, and the target report object, which would be used for the amount, may be of a corresponding size (approximately three quarters) of the size of the source report field. If in a cell in the source report there is a text field, then the cell positioning and cell size would be used to determine the position and size of one target report object in the target report, such as the target report object 335.

In one embodiment, the target report objects from the target report may store data fields by using a formula that contains a text defined by the units of measure and the value, separated by an interval. The formula may look like the following example:

$$\text{Text} := \text{Unit} + \text{" "} + \text{Value} \quad (5)$$

Figure 4:
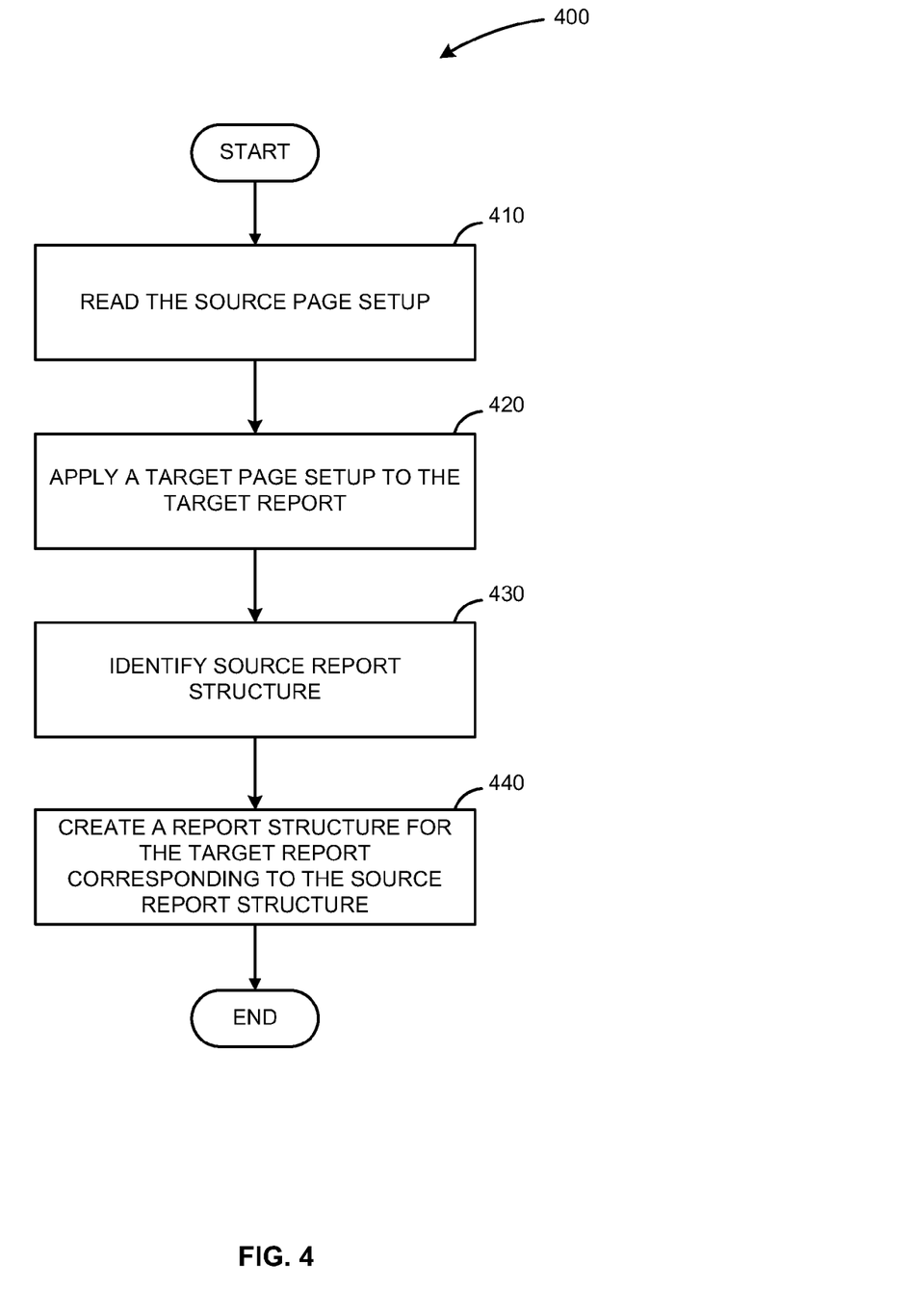
FIG. 4 is a flow diagram illustrating an embodiment of a method for converting report formatting settings of a source report to report formatting settings of a target report.

FIG. 4 is a flow diagram illustrating an embodiment of a method 400 for converting report formatting settings of a source report (e.g., 110 of FIG. 1) to report formatting settings of a target report (130 of FIG. 1). The method begins at process step 410, where the source page setup of the source report (e.g., 110), is read. Then, at step 420, a target page setup is applied to the target report according to the information that is received from reading the source page setup. Values for the report page height and width are acquired and converted to the appropriate dimension that stores these values for the target report. The page height and width are the height and width of the paper area of the report page on which a report is going to be rendered. The page orientation is read from the source report and applied to the target report. At step 430, the source report structure with the source report sections is identified. Based on the defined source report sections, at step 440, a target report structure constructed of bands is created, where the bands from the target report correspond to the source report sections that exist in the source report structure.

Figure 5:
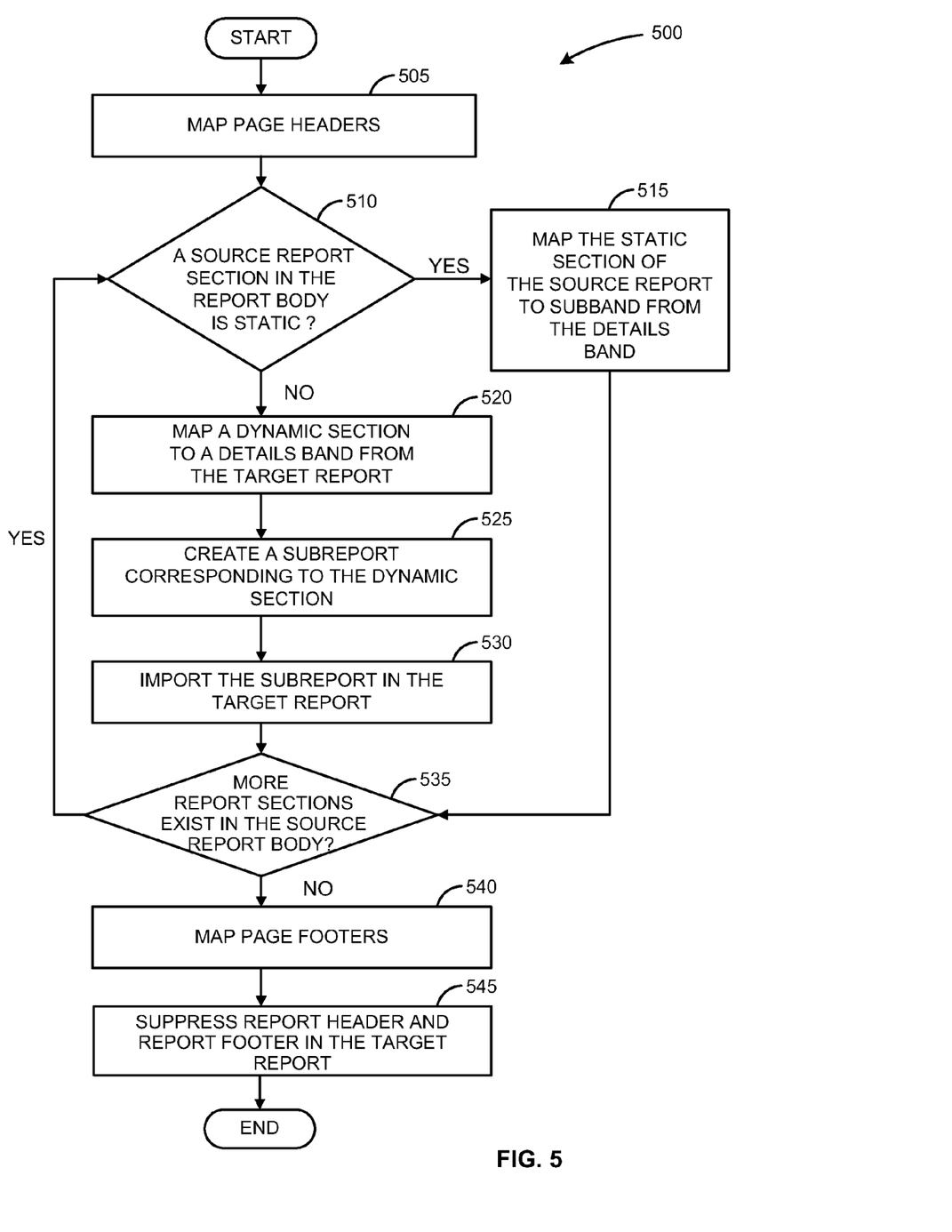
FIG. 5 is a flow diagram illustrating an embodiment of a method for creating a report structure for a target report with one or more bands corresponding to a report structure of a source report related to a markup data schema.

FIG. 5 is a flow diagram illustrating an embodiment of a method 500 for creating a report structure for a target report with one or more bands corresponding to a report structure of a source report (e.g., 110 in FIG. 1) related to a markup data schema. The source report contains source report sections which may include a source page header, a source report body, and a source page footer. The source report body of the source report may contain static sections and dynamic sections. According to one embodiment, static sections have a fixed number of rows and columns and may include sections with no data connection (e.g. graphics or texts), or a data connection with a fixed number of rows. In one embodiment, dynamic sections have a fixed number of columns but a variable number of rows, based on the associated data provider for the sections. Dynamic section may be based on a query and may be separated in groups.

With the method 500, the source report sections from the source report are mapped to bands from the target report (e.g., 130 in FIG. 1). At step 505, the source page header from the source report is mapped to the target page header from the target report. At decision block 510, it is determined whether a section from the report body is a static section. If there is a static section, at step 515, the static section is mapped to a subband from the details bands of the target report structure. Otherwise, if in the report body of the source report there are dynamic sections at step 520, the dynamic sections are mapped to details bands from the target report structure.

At step 525, a subreport related to a banded report schema, such as the banded report schema for the target report 130 in FIG. 1, is created. It corresponds to the dynamic section that exists in the source report body. At step 530, the subreport is imported into a subband of the details band. At decision block 535 it is determined whether there are more source report sections in the source report. If there are more sections, it navigates to decision block 510, where it will be checked if the section is a dynamic or a static one. A mapping from the source page footer from the source report to the target page footer is executed at step 540. At step 545, the target report header and the target report footer from the target report in the banded report schema are bands that are suppressed, because they do not match to a source report section from the source report.

Figure 6:
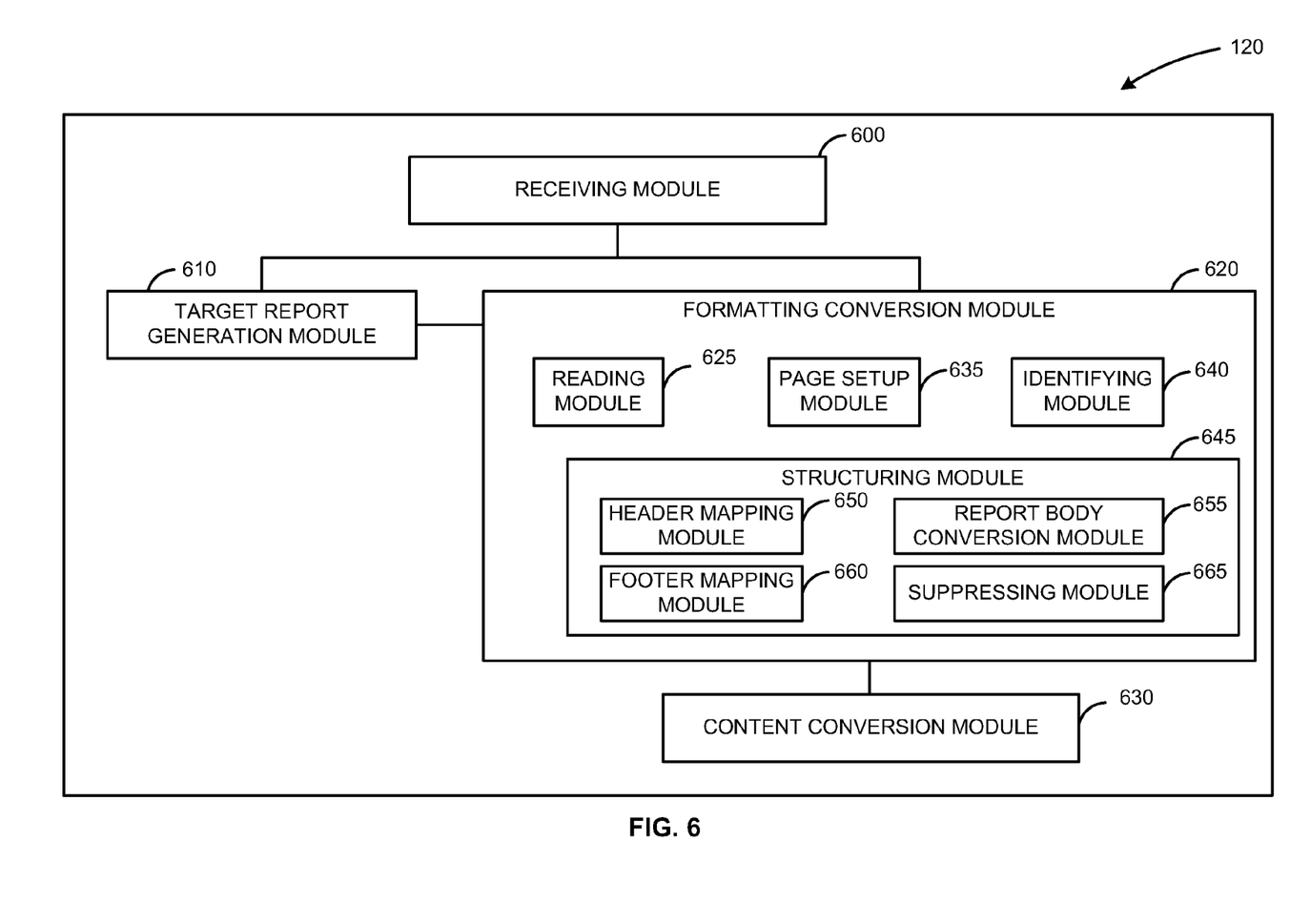
FIG. 6 is a block diagram illustrating an embodiment of a conversion module for conversion of a source report related to a markup data schema into a target report related to a banded report schema.

FIG. 6 is a block diagram illustrating an embodiment of a conversion module 120 for conversion of a source report related to a markup data schema into a target report related to a banded report schema. The conversion module 120 may include one or more processors for executing program code, associated with a repository (e.g., 150 in FIG. 1). The conversion module 120 further includes a receiving module 600 that allows the access to a source report (e.g., 110 in FIG. 1) related to a markup data schema. The receiving module 600 is connected to a target report generation module 610 and a formatting conversion module 620. The target report generation module 610 creates a target report (e.g., 130 in FIG. 1) related to a banded report schema that would be transformed to correspond to the source report. The target report is created as a blank report. The formatting conversion module 620 uses the source report that is received from the module 600 and converts report formatting settings from the source report to report formatting settings of the target report. A content conversion module 630 is connected to the formatting conversion module 620 and converts report content of the source report and the report content layout of the source report to the target report.

The formatting conversion module 620 has a reading module 625 that accesses the source report and reads a source page setup of the source report. The source page setup is defined by page orientation, page height, and page width. A page setup module 635 accesses the target report and applies a target page setup that corresponds to the source page setup. Identification of the report structure of the source report is done by an identifying module 640 that identifies the source report structure of the source report. In one embodiment, the source report structure has source report sections with a grid layout of rows with cells. There are row patterns for the rows to give reference to the report content and defining the report content layout. A structuring module 645 takes the identified source report structure and creates a target report structure for the target report with one or more bands. The target report structure and the bands correspond to the sections from the source report. The source report sections may be source page header, source report body, and source page footer.

The structuring module 645 has a set of modules for mapping the source report sections and converting them to a corresponding band from the target report structure of the target report. In one embodiment, there is a header mapping module 650 to map the source page header from the source report to the target page header of the target report. The source report body may have static and dynamic sections. A report body conversion module 655 takes the source report body and converts it to a details band from the target report. The dynamic sections from the source report body are converted to a subband where a subreport is embedded. The subreport corresponds to the dynamic section from the source report and is defined in a banded report schema, such as the banded report schema of the source report 130 in FIG. 1. The static sections from the source report are converted to details bands in the target report. A footer mapping module 660 is used to map the source page footer from the source report to the target page footer of the target report. The target report header and target report footer from the target report are suppressed using a suppressing module 665. These sections do not have counterparts in the target report structure.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems may be configured in a server-client, peer-to-peer, or some other configuration. The clients may vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
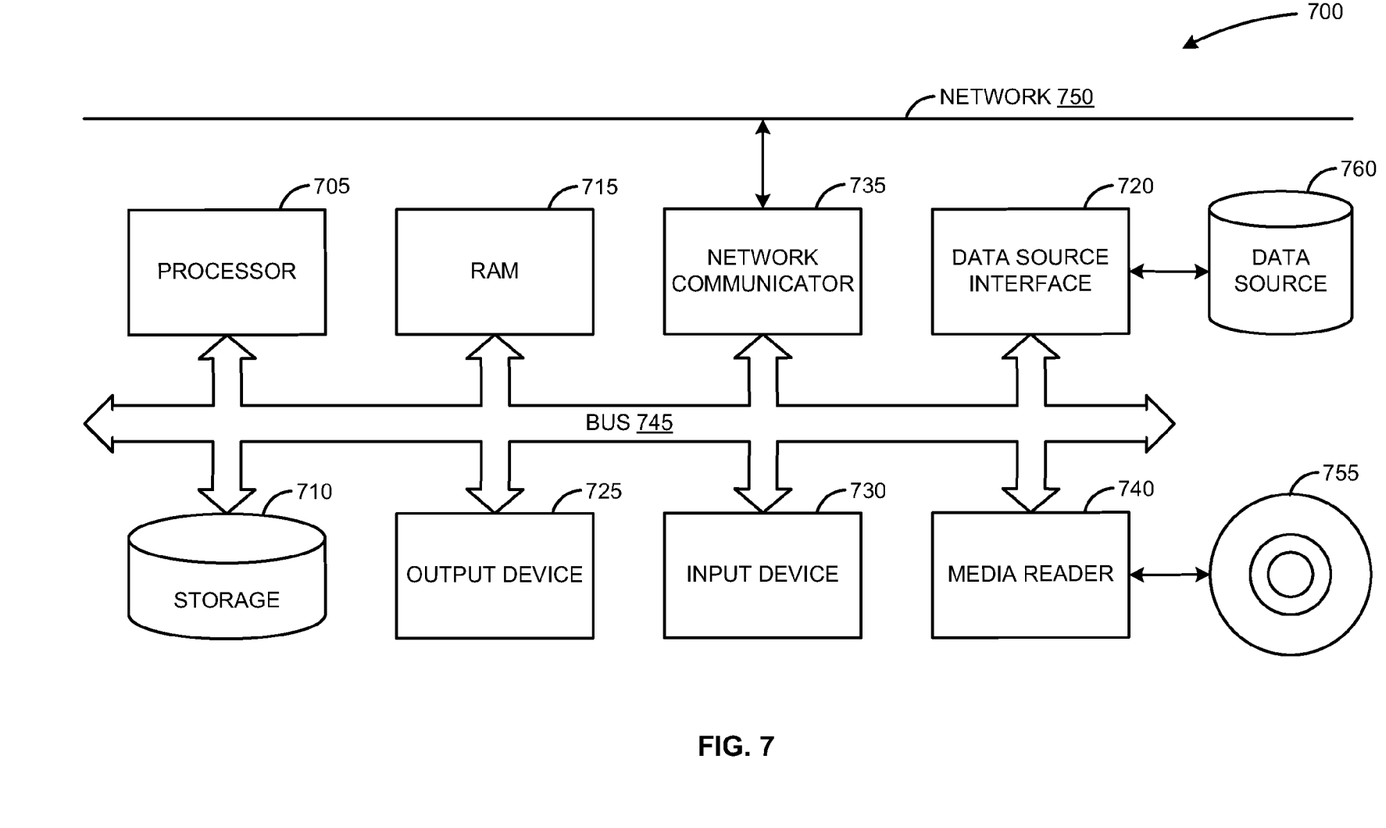
FIG. 7 is a block diagram illustrating a computing environment in which the techniques described for conversion of reports can be implemented, according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 may be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for conversion of reports, the method comprising:
   receiving a first report in a markup data schema;
   creating a second report in a banded report schema, wherein the second report is created as a blank report and the banded report schema comprises one or more bands;
   converting first report formatting settings of the first report into second report formatting settings of the second report, wherein the first report formatting settings comprise a first page setup and a first report structure, wherein the second report formatting settings comprise a second page setup and a second report structure, wherein the second page setup corresponds to the first page setup and the second report structure corresponds to the first report structure, and wherein converting the first report formatting settings of the first report into the second report formatting settings of the second report comprises:
   creating the second report structure for the second report with the one or more bands corresponding to the first report structure of the first report, wherein the first report structure comprises a first report section comprising a first page header, a first report body, and a first page footer, wherein the one or more bands from the second report comprises a second report header, a second page header, a second page footer, a second report footer, and a details band, wherein the details band comprises a subband, and wherein creating the second report structure comprises:
  mapping the first page header from the first report to the second page header from the second report;
  converting the first report body from the first report to the details band of the second report, wherein the first report body comprising a static section and a dynamic section, and wherein converting the first report body comprises:
    mapping the dynamic section of the first report body to a first subband of the details band of the second report;
    creating a subreport in a banded report schema corresponding to the dynamic section, when the dynamic section exists in the first report structure;
    importing the subreport into the first subband of the details band; and
    mapping the static section of the first report body to a second subband of the details band of the second report;
  mapping the first page footer from the first report to the second page footer of the second report; and
  suppressing the second report header and the second report footer in the second report structure;
converting report content and report content layout from the first report into the second report, wherein the report content comprises information presented in the first report and the report content layout comprises a report content positioning and display properties of the report content.

2. The method of claim 1, wherein the first report comprises the first report formatting settings, the report content and the report content layout, and wherein the first page setup comprising page orientation, page height, and page width; wherein the first report section comprises a grid layout of a row with one or more cells with one or more row patterns for giving reference to the report content and defining the report content layout, and wherein the report content comprises one or more first report fields and one or more first report objects and the display properties of the report content comprises one or more styles and a row pattern rule.

3. The method of claim 2, wherein converting the first report formatting settings from the first report to the second report formatting settings of the second report further comprises:
  reading the first page setup from the first report;
  applying the second page setup to the second report corresponding to the first page setup; and
  identifying the first report structure from the first report.

4. The method of claim 3, wherein converting the report content and the report content layout from the first report to the second report further comprises:
  making a connection to a repository that stores the report content and the display properties of the report content of the first report;
  determining a second report content positioning and size for second report objects in the second report based on sizes and positions of the one or more cells in the first report, number of the one or more first report fields within the one or more cells in the first report, and content type of one or more fields stored in the one or more cells of the first report;
  inserting the second report objects in the second report, corresponding to the one or more cells presenting the report content, from the repository that stores the report content and the display properties of the report content of the first report;
  applying the second report content positioning for the second report objects in the second report;
  converting the one or more styles from the first report into corresponding styles in the second report;
  applying a matching style for the second report objects in the second report from the corresponding styles;
  converting the row pattern rule defined for the one or more row patterns in the first report from the repository into a conditional formula for formatting settings in the second report; and
  applying the conditional formula for formatting settings in the second report, wherein the row pattern rule defined for the one or more row patterns in the first report is valid.

5. The method of claim 4, wherein determining the second report content positioning for the second report objects, further comprises:
  reading first cell size and first cell position of the one or more cells storing the one or more first report fields of the first report;
  reading the number of the one or more first report fields within the one or more cells;
  identifying the content type of the one or more first report fields of the first report;
  calculating sizes of the second report objects in the second report on the basis of the first cell size and the number of the one or more first report fields within the one or more cells; and
  calculating positions of the second report objects in the second report on the basis of the first cell position of the one or more cells storing the one or more first report fields, the calculated size of the second report objects, and a position of a field from the one or more first report fields within the one or more cells, and the content type of the one or more first report fields of the first report.

6. The method of claim 1, wherein the second report is in an .RPT format.

7. A computer system for conversion of reports, comprising:
  a processor; and
  a memory in association with the processor storing instructions related to:
    a receiving module to receive a first report defined in a markup data schema;
    a second report generation module connected to the receiving module to create a second report in a banded report schema, wherein the second report is created as a blank report and the banded report schema comprises one or more bands;
    a formatting conversion module connected to the receiving module and the second report generation module, to convert first report formatting settings of the first report into second report formatting settings of the second report, wherein the first report formatting settings comprise a first page setup and a first report structure, wherein the second report formatting settings comprise a second page setup and a second report structure, and wherein the second page setup corresponds to the first page setup and the second report structure corresponds to the first report structure; and
    a content conversion module connected to the formatting conversion module, to convert report content and report content layout from the first report into the second report, wherein the report content comprises information presented in the first report and the report content layout comprises definitions of position and display properties of the report content, wherein the first report structure comprises a first report section, wherein the first report section comprises a grid layout of a row with one or more cells with one or more row patterns for giving reference to the report content and defining the report content layout, wherein the report content comprises one or more first report fields and one or more first report objects and the display properties of the report content comprises one or more styles and a row pattern rule, and wherein the content conversion module is further operable to:
  make a connection to a repository that stores the report content and the display properties of the report content of the first report;
  determine a second report content positioning and size for second report objects in the second report based on sizes and positions of one or more cells in the first report, number of the one or more first report fields within the one or more cells in the first report, and content type of one or more first report fields stored in the one or more cells of the first report;
  insert the second report objects in the second report, corresponding to the one or more cells presenting the report content, from the repository that stores the report content and the display properties of the report content of the first report;
  apply the second report content positioning for the second report objects in the second report;
  convert the one or more styles from the first report into corresponding styles in the second report;
  apply a matching style for the second report objects in the second report from the corresponding styles;
  convert the row pattern rule defined for the one or more row patterns in the first report from the repository into a conditional formula for formatting settings in the second report; and
  apply the conditional formula for formatting settings in the second report, wherein the row pattern rule defined for the one or more row patterns in the first report is valid.

8. The computer system of claim 7, wherein the first report comprises the first report formatting settings, the report content and the report content layout, and wherein the first page setup comprising page orientation, page height, and page width; and wherein the one or more bands from the second report comprises a second report header, a second page header, a second page footer, a second report footer, and a details band, wherein the details band comprises a subband.

9. The computer system of claim 8, wherein the formatting conversion module further comprises:
  a reading module to read the first page setup from the first report;
  a page setup module to apply the second page setup to the second report corresponding to the first page setup;
  an identifying module to identify the first report structure from the first report; and
  a structuring module to create the second report structure for the second report with the one or more bands corresponding to the first report structure of the first report.

10. The computer system of claim 9, wherein the first report section comprises a first page header, a first report body, and a first page footer, and wherein the structuring module further comprises:
  a header mapping module to map the first page header from the first report to the second page header from the second report;
  a report body conversion module to convert the first report body from the first report to the details band of the second report, wherein the first report body comprising a static section and a dynamic section, and wherein the report body conversion module is further operable to:
    map the dynamic section of the first report body to a first subband of the details band of the second report;
    create a subreport in a banded report schema corresponding to the dynamic section, when the dynamic section exists in the first report structure;
    import the subreport into the first subband of the details band; and
    map the static section of the first report body to a second subband of the details band of the second report;
  a footer mapping module to map the first page footer from the first report to the second page footer of the second report; and
  a suppressing module to suppress the second report header and the second report footer in the second report structure.

11. The computer system of claim 9, wherein determining the report content positioning is further operable to:
  read first cell size and first cell position of the one or more cells storing the one or more first report fields of the first report;
  read the number of the one or more first report fields within the one or more cells;
  identify the content type of the one or more first report fields of the first report;
  calculate sizes of the second report objects in the second report on the basis of the first cell size and the number of the one or more first report fields within the one or more cells; and
  calculate positions of the second report objects in the second report on the basis of the first cell position of the one or more cells storing the one or more first report fields, the calculated size of the second report objects, and a position of a field from the one or more first report fields within the one or more cells, and the content type of the one or more first report fields of the first report.

12. The computer system of claim 7, wherein the second report is in an .RPT format.

13. An article of manufacture for conversion of reports, comprising a non-transitory computer readable storage medium including executable instructions, which when executed by a computer, cause the computer to:
  receive a first report defined in a markup data schema;
  create a second report in a banded report schema, wherein the second report is created as a blank report and the banded report schema comprises one or more bands;
  convert first report formatting settings of the first report into second report formatting settings of the second report, wherein the first report formatting settings comprise a first page setup and a first report structure, wherein the second report formatting settings comprise a second page setup and a second report structure, and wherein the second page setup corresponds to the first page setup and the second report structure corresponds to the first report structure; and
  convert report content and report content layout from the first report to the second report, wherein the report content comprises information presented in the first report and the report content layout comprises definitions of position and display properties of the report content.

14. The article of manufacture in claim 13, wherein the first report comprises the first report formatting settings, the report content and the report content layout, and wherein the first page setup comprising page orientation, page height, and page width; and the first report structure comprising a first report section, wherein the first report section comprises a grid layout of a row with one or more cells with one or more row patterns for giving reference to the report content and defining the report content layout, wherein the report content comprises one or more first report fields and one or more first report objects and the display properties of the report content comprises one or more styles and a row pattern rule, and wherein the one or more bands from the second report comprises a second report header, a second page header, a second page footer, a second report footer, and a details band, wherein the details band comprises a subband.

15. The article of manufacture in claim 14, wherein the instructions to convert the first report formatting settings from the first report to the second report formatting settings of the second report further comprise instructions, which when executed by a machine cause the machine to:
read the first page setup from the first report;
apply the second page setup to the second report corresponding to the first page setup;
identify the first report structure from the first report; and
create the second report structure for the second report with the one or more bands corresponding to the first report structure of the first report.

16. The article of manufacture in claim 15, wherein the first report section comprises a first page header, a first report body, and a first page footer, and wherein the instructions to create the second report structure for the second report further comprises instructions, which when executed by a machine cause the machine to:
map the first page header from the first report to the second page header from the second report;
convert the first report body from the first report to the details band of the second report, wherein the first report body comprising a static section and a dynamic section, and wherein converting the first report body comprises:
map the dynamic section of the first report body to a first subband of the details band of the second report;
create a subreport in a banded report schema corresponding to the dynamic section, when the dynamic section exists in the first report structure;
import the subreport into the first subband of the details band; and
map the static section of the first report body to a second subband of the details band of the second report;
map the first page footer from the first report to the second page footer of the second report; and
suppress the second report header and the second report footer in the second report structure.

17. The article of manufacture in claim 15, wherein the instructions to convert the report content and the report content layout from the first report to the second report further comprise instructions, which when executed by a machine cause the machine to:
make a connection to a repository that stores the report content and the display properties of the report content of the first report;
determine a second report content positioning and size for second report objects in the second report based on sizes and positions of the one or more cells in the first report, number of the one or more first report fields within the one or more cells in the first report, and content type of one or more fields stored in the one or more cells of the first report;
insert the second report objects in the second report, corresponding to the one or more cells presenting the report content, from the repository that stores the report content and the display properties of the report content of the first report;
apply the second report content positioning for the second report objects in the second report;
convert the one or more styles from the first report into corresponding styles in the second report;
apply a matching style for the second report objects in the second report from the corresponding styles;
convert the row pattern rule defined for the one or more row patterns in the first report from the repository into a conditional formula for formatting settings in the second report; and
apply the conditional formula for formatting settings in the second report, wherein the row pattern rule defined for the one or more row patterns in the first report is valid.

18. The article of manufacture in claim 17, wherein the instructions to determine the report content positioning of the one or more first report fields from the first report further comprises instructions, which when executed by a machine cause the machine to:
read first cell size and first cell position of the one or more cells storing the one or more first report fields of the first report;
read the number of the one or more first report fields within the one or more cells;
identify the content type of the one or more first report fields of the first report;
calculate sizes of the second report objects in the second report on the basis of the first cell size and the number of the one or more first report fields within the one or more cells; and
calculate positions of the second report objects in the second report on the basis of the first cell position of the one or more cells storing the one or more first report fields, the calculated size of the second report objects, and a position of a field from the one or more first report fields within the one or more cells, and the content type of the one or more first report fields of the first report.

\* \* \* \* \*